Figure 1:
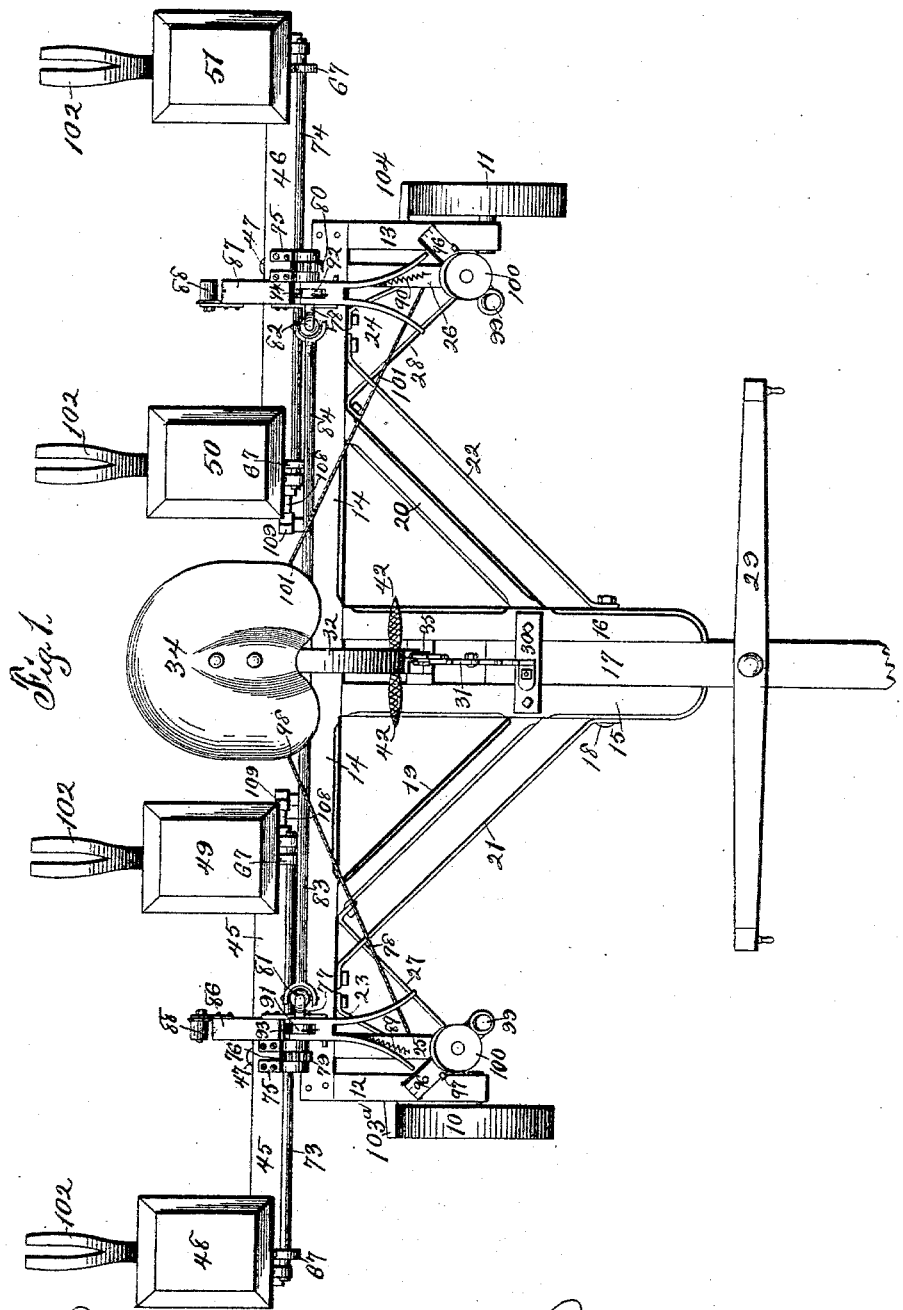

(No Model.) 3 Sheets—Sheet 1.
R. V. BARRY.
AUTOMATIC CHECK ROW CORN PLANTER.

No. 597,193. Patented Jan. 11, 1898.

Witnesses: Jas. Barels. S. C. Sweet.

Inventor: Richard V. Barry
By Thomas G. and J. Ralph Orwig, Attorneys.

(No Model.)  3 Sheets—Sheet 2.
R. V. BARRY.
AUTOMATIC CHECK ROW CORN PLANTER.
No. 597,193.  Patented Jan. 11, 1898.
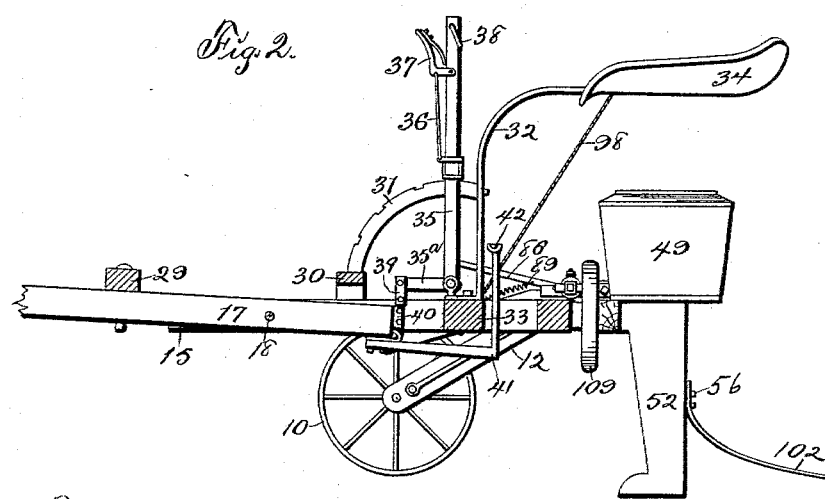
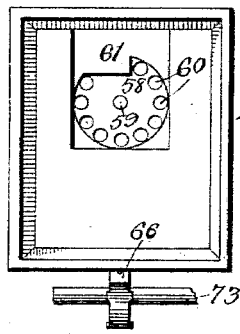
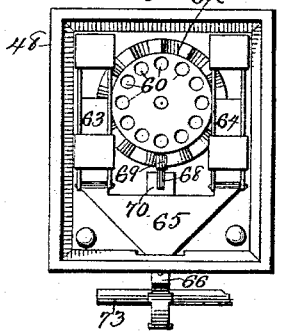
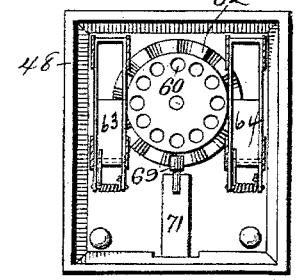
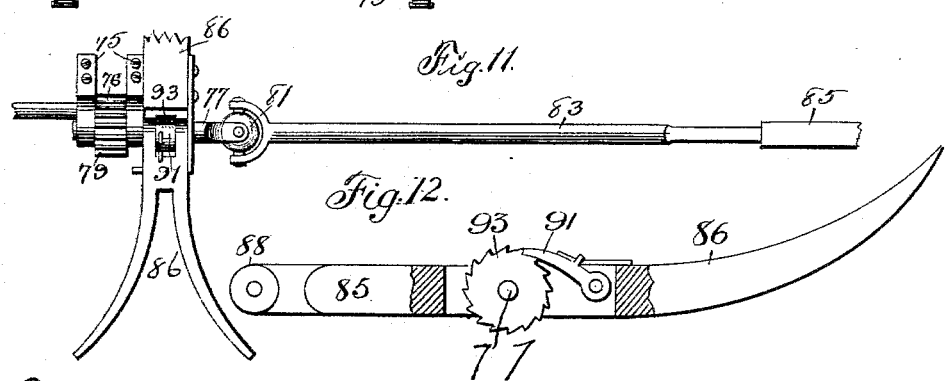
Witnesses:  Inventor: Richard V. Barry,
Jas. Barels.  By Thomas G. and J. Ralph Orwig,
S. C. Sweet.  Attorneys.

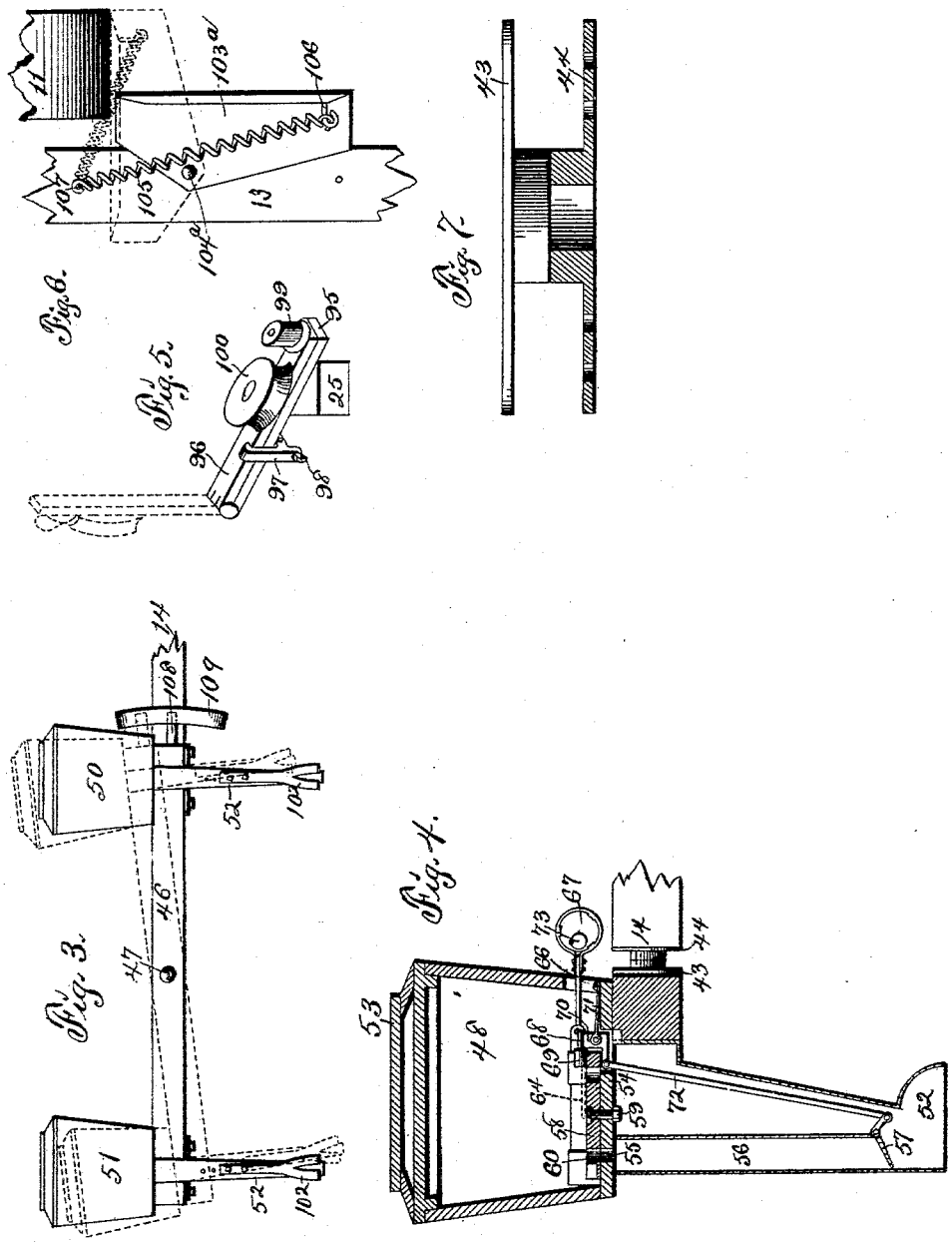

UNITED STATES PATENT OFFICE.

RICHARD V. BARRY, OF STUART, IOWA, ASSIGNOR OF ONE-HALF TO JACOB R. BATES, OF SAME PLACE.

AUTOMATIC CHECK-ROW CORN-PLANTER.

SPECIFICATION forming part of Letters Patent No. 597,193, dated January 11, 1898.

Application filed May 6, 1897. Serial No. 635,303. (No model.)

*To all whom it may concern:*

Be it known that I, RICHARD V. BARRY, a citizen of the United States, residing at Stuart, in the county of Guthrie and State of Iowa, have invented a new and useful Four-Row Automatic Check-Row Corn-Planter, of which the following is a specification.

The objects of this invention are to provide improved means for raising and lowering the runners of a corn-planter and regulating the depth of furrow and planting of the seeds thereby, improved means for regulating the dropping of the seeds in alinement, improved means for connecting two pairs of runners, improved means for regulating the number of seeds dropped either in check-rows or drills, improved means for applying a knotted chain to a drop mechanism, a guard for protecting vibrating seedbox-carriers, an improved device for covering the dropped seeds, an adjustable wheel-scraper, and means for throwing the knotted chain off the machine when the line of travel is to be reversed.

This invention consists in the construction, arrangement, and combination of elements hereinafter set forth, pointed out in my claims, and illustrated by the accompanying drawings, in which—

Figure 1 is a plan of a corn-planter embodying my invention, the forward portion of the tongue being broken away. Fig. 2 is a sectional elevation of the planter-machine shown in Fig. 1, the section being taken longitudinally of and to one side of the tongue. Fig. 3 is a detail rear elevation of one pair of seedboxes and the mechanism supporting the same. Fig. 4 is a sectional elevation of one of the runners and seedboxes. Fig. 5 is a detail perspective of the mechanism employed to throw off the knotted chain, wire, or cord when the machine is to be reversed. Fig. 6 is a detail plan of a portion of the machine-frame, a portion of a wheel, and the adjustable wheel-scraper, the dotted lines indicating the operative position of the scraper relative to the wheel. Fig. 7 is a plan, partly in section, of a coupling or pivot whereby the box-carriers are mounted on the machine-frame. Figs. 8, 9, and 10 are details of the seedboxes. Fig. 11 is a detail plan illustrating the manner of connecting the check-shaft to the dropper-shafts and the means employed to cover the dropped seeds. Fig. 12 is a detail elevation, partly in section, of one of the check-yokes, showing the ratchet-and-pawl mechanism carried thereby.

In the construction of the machine as shown the numerals 10 11 designate supporting-wheels revolubly connected to spindles, which spindles are mounted rigidly in the lower forward ends of side bars 12 13. The rear upper ends of the side bars 12 13 are connected to the outer ends of a beam 14, and the central portion of said beam is connected to hounds 15 16, extended forwardly therefrom on opposite sides of a tongue 17, the tongue being pivoted to the hounds by a bolt 18. The hounds 15 16 are further fixed to the beam 14 by wooden braces 19 20 and iron braces 21 22. The side bars 12 13 are further connected to the beam 14 by metal braces 23 24. Bracket-arms 25 26 project forwardly from the beam 14 at points adjacent to side bars 12 13 and in planes above the braces 23 24, which bracket-arms are further connected and supported by metal braces 27 28, leading from the outer ends thereof to points of attachment upon the wooden braces 19 20 adjacent to the beam 14. The beam 14, hounds 15 16, braces 19 20 21 22, side bars 12 13, braces 23 24, bracket-arms 25 26, and braces 27 28 conjunctively form the frame of the machine, carried upon the wheels 10 11 by the spindles aforesaid and advanced over the surface of the ground by draft applied to a doubletree 29 on the tongue 17, the frame having a movement of oscillation relative to the tongue through the medium of the pin 18. The movement of oscillation of the frame relative to the tongue is dependent, of course, upon the assumption that the tongue is held approximately horizontal by attachment to the neck-yoke of the draft-animals, and such movement is effected, limited, and controlled in two ways and by two sets of mechanism about to be described. A cross-bar 30 is mounted on the hounds 15 16 transversely of the rear end portion of the tongue 17, and a segmental rack 31 is fixed at its lower end to said bar and at its upper end to a spring-seat bar 32, mounted on a block 33 between the hounds and carrying a seat 34 on its upper end. A bell-crank hand-lever 35 is fulcrumed on a stand fixed to the block 33 directly in front of the seat 34, and the long arm of said lever is provided with a pawl 36, arranged for engagement with the notches of the segmental rack 31. The pawl 36 is provided with the ordinary tripping-lever 37, pivoted upon the upper end portion of the upright member of the bell-crank lever 35, and a ring 38 is pivoted in said member of the lever 35 and is arranged to be engaged at times over the tripping-lever 37 to hold the pawl 36 out of engagement with either of the notches of the segmental rack. A lower and shorter member 35ª of the bell-crank hand-lever 35 is pivotally connected by means of a link 39 at its outer end with a bar 40 on the rear end of the tongue 17. The bar 40 is provided with a series of perforations, one or another of which may be employed to receive a pin traversing a registering perforation in the link 39, more than one perforation being provided in the bar 40 for the purpose of effecting an adjustable connection between the tongue and the bell-crank hand-lever 35. The parts being in the position shown in Fig. 2 of the drawings and the tongue being held approximately stationary by attachment to the neck-yoke of the draft-animals employed, force may be applied to the lever 35, the tripping-lever 37 first releasing the pawl 36 from the rack to oscillate said hand-lever and in so doing oscillate the frame of the machine on the axis of the spindles in the supporting-wheels.

Sometimes it is not convenient to manually operate the device, and therefore I have provided the ring 38, which, being engaged over the tripping-lever 37, will hold the pawl 36 out of engagement with the rack 31. An angle-lever 41 is fixed at its forward end to the rear end of the tongue 17 and is provided with pedals 42, whereby a pressing force may be applied thereto, which force, applied by foot-power to the pedals and acting through the angle-lever 41, will oscillate the hand-lever 35 through the medium of the bar 40 and link 39 and in so doing oscillate the frame of the machine in like manner as it is described as being oscillated by the hand-lever.

Bearings 43 44, Figs. 4 and 7, of identical construction, are mounted in pairs at the rear and near the ends of the beam 14. The bearings 43 44 are each composed of an angular hub flanged at one end and with the flanges apertured to admit screws or bolts for attachment thereof to the beam or any other wooden support. The bearings 44 are fixed to the rear face of the beam 14, one at each end of said beam, and the bearings 43 are fixed to the front faces of vibrating box-carriers or bars 45 46, the hubs of the bearings on the box-carriers meeting with the hubs of the bearings on the beam 14. A bolt 47 is mounted in the bore of each of the pairs of hubs of the bearings 43 44 and traverses the beam 14 and one or another of the vibrating box-carriers 45 46, whereby the bearings are supported and connected.

Seedboxes 48 49 and 50 51 are mounted on the end portions of the box-carriers 45 46, respectively, which seedboxes are of identical construction and identically-constructed mechanism therein for the purpose of regulating the dropping of seed therefrom into four shoes or runners of identical construction, one of which is shown in detail in Fig. 4 and designated by the numeral 52. Since the seedboxes are of identical construction and the dropping mechanism is alike in all of them and the shoes or runners are of like construction, I will describe one only of the four like sets of mechanism. The box 48, Fig. 4, is provided with a cover 53, removable for the purpose of filling the box with seed-corn, and also is provided with a bottom 54, and provided with a seed-port 55, opening to a standard 56 in the runner 52. The lower end of the standard 56 is closed by a dropping-valve 57. The seed-port 55 is controlled by a disk valve 58, pivotally mounted on a pin 59, traversing the bottom 54 of the box. The disk valve 58 is formed with a series of ports or apertures 60, arranged in a row in close relation to each other and concentric with the axis of the pin 59. A plate 61 is located immediately above the disk valve 58 and is provided with a tongue or projecting portion closing over that one of the ports 60 at that time in alinement with the port 55, thus preventing the dropping of seed continuously through the port 60 and the port 55. The disk valve 58 is provided with a ratchet-face and perimeter portion 62 and hinged actuating-pawls 63 64 (the first to pull and the second to push) are slidingly mounted in engagement with the ratchets thereon. The pawls 63 64 are connected by a plate 65, to which is attached an eccentric-rod 66, leading to and from an eccentric 67. The pawls 63 64 operate on opposite sides of the center or axis of the disk valve 58, and located between said pawls is a spindle 68, carrying an antifriction-roller 69, engaging successively with the ratchets of said disk valve. The spindle 68 is fixed rigidly to block 70, downwardly impelled by a leaf-spring 71, and the lower end of said block is formed into an arm and joined by a connecting-rod 72 to the dropping-valve 57 in the runner 52. There is one of these eccentrics 67 provided for each of the dropping-boxes and located on the side thereof adjacent to or nearest to the longitudinal axis of the beam 14, and said eccentrics are connected in pairs by dropping-shafts 73 74, as clearly shown in Fig. 1.

Mounted on the central portion of each of the box-carriers 45 46 are a pair of journal-bearings 75, which journal-bearings are traversed by the central portions of the shafts 73 74, and pinions 76 are mounted on each of said shafts within the pairs of journal-bearings. The journal-bearings 75 are also traversed by short shafts 77 78, and spur-gears 79 80 are mounted on the short shafts between the journal-bearings and mesh with the pinions 76 76. The short shafts 77 78 are connected at their inner ends by universal joints 81 82 to members 83 84 of a check-shaft, the inner end portions of which members are made angular and inserted in the opposite end portions of a sleeve 85, as illustrated in Fig. 11. The sleeve 85 and members 83 84, forming the check-shaft, have no other support than the universal joints or couplings 81 82, whereby they are connected to the short shafts 77 78, and it is the sole function of this check-shaft to transmit motion from one of the check devices to the other, which check devices are about to be described. Check-yokes 86 87 are of identical construction, bifurcated at their forward ends and provided with notches at their rear ends, which notches are faced on one side by antifriction-rollers 88, are mounted loosely on the short shafts 77 78, and lie approximately horizontal transversely of said shafts. The check-yokes are held normally in horizontal positions by retractile coil-springs 89 90, connecting the forward or bifurcated end portions of said yokes to the bracket-arms 25 26 of the frame. The check-yokes 86 87 carry pawls 91 92, pivoted thereon and resting upon ratchet-wheels 93 94, which ratchet-wheels are mounted rigidly on the short shafts 77 78. A check-wire carrier and guide, as illustrated by Figs. 1 and 5, is provided and constructed as follows: A plate 95 is located in the bracket-arm 25 at an oblique angle to the longitudinal axis of said bracket-arm, and a plate 96 is hinged at its outer and upper end to said plate 95. The plates 95 96 are approximately the same size and shape and normally rest the one upon the other and are held in contact with each other by a hook 97, pivoted to the plate 95 and engaging over the upper surface of the plate 96. The hook 97 is attached by its lower arm to the outer end of a cord 98, the upper and inner end of said cord being attached to the seat 34. An antifriction-roller 99 is mounted on a stud projecting upwardly from the upper face of the plate 96, and an antifriction grooved roller or retaining-wheel 100 is mounted in opposition to the roller 99. A check-wire carrier and guide identical with the one just described is mounted on the bracket-arm 26, and the hook thereof is controlled by a cord 101, attached thereto at its outer end and to the seat 34 at its upper and inner end. The check-wire is stretched across the field and guided between the grooved wheel 100, and the roller 99 of the device, mounted on the bracket-arm 25, is laid in the bifurcation of the yoke 86 and placed between the rear end of said yoke and the antifriction-roller 88 thereon. The machine is then moved forwardly, and in so doing the yoke is brought into contact with one of the knots of the check wire or chain, which oscillates the yoke 86 by carrying the bifurcated end portion thereof upwardly and rearwardly. The pawl 91 engages the ratchet-wheel 93 and in so doing rotatably moves the short shaft 77. In the rotary movement of the short shaft 77 the check-shaft is rotated and communicates its movement to the short shaft 78, and the short shafts 77 78, acting through the spur-gears 79 80, rotate the pinions 76, and consequently the dropping-shafts 73 74. In the rotation of the dropping-shafts 73 74 the eccentrics 67 all are rotated, and, acting through the pitmen or rods 66 and pawls 63 64, rotate the disk valves 58, collecting the seeds in the ports 60 and dropping them through the port 55 into the standard 56 and upon the valve 57. In the rotation of the disk valves 58 the antifriction-wheel 69 is raised or lowered continuously and successively by reason of the undulating surface on which it rides, and, acting through the spindles 68, raises and lowers the block 70, reciprocates the rod 72, oscillates the valve 57, and drops the seed through the lower portions of the shoes or runners into the furrow or groove made in the surface of the ground by said shoes or runners in the advancement of the machine. The bifurcated end portion of the yoke continues to move upwardly and rearwardly until the knot on the wire is released therefrom, and then said yoke is immediately repositioned forwardly and downwardly by the spring 69 and is next engaged by the next succeeding knot on the check-wire, and thus continuously, successively, and progressively operates to the limit of travel in that direction. The furrows or grooves made by the runners in the ground are closed, concealed, and covered, covering the seeds therein, by dragging-forks 102, fixed to and extending rearwardly and downwardly from each of the standards 56 of the runners. It is obvious that a grooved wheel may be mounted on the lower end portion of the dragging-forks and be caused to engage the earth on either side of the furrow or groove formed by the runner and serve the same purpose of covering the seeds as is preferably served by the use of the forks in immediate engagement with the ground. Each of the box-carriers 45 46 is provided with a spindle or stem 108 on its inner end, which spindle or stem travels in and has its movement in all directions limited by a guide 109, fixed to the beam 14.

Provision is made for oscillating or vibrating the seedbox-carriers in order that the runners may conform in elevation to different elevations of ground, and acting in conjunction with the oscillation of the frame of the machine, as heretofore described, the movement or vibration of the box-carriers will effect an equalization or elevation of the runners sufficient to provide against unequal and indiscriminate distribution of the seeds. Upon crossing the field and before stopping the draft-animals the operator applies manual draft to the cord 98, releasing the hook 97 from the plate 96, and the draft or strain of the cord against the wheel 100 will lift the plate 96 into the position as shown by dotted lines in Fig. 5, leaving the check cord or wire clear of the machine and depositing the same upon the ground to the right of the machine as the draft-animals are turned to the left to reverse the direction of travel across the field. The operator now positions the check-wire in the yoke 87 and in the carrier mounted on the bracket-arm 26 and proceeds in the reverse direction across the field, the parts operating identically as heretofore described. Upon reaching the limit of travel in the latter-mentioned direction the operator applies manual draft to the cord 101, and the carrier mounted on the bracket-arm 26 operates to lift the check-wire away from the yoke and deposit the same on the ground to the left of the machine.

Scraper or cleaner blades 103ª 104, one of which is shown in detail in Fig. 6, are mounted pivotally on the lower face of the side bars 12 13 of the planter-frame, a pin 104ª being shown in Fig. 6 as the means employed to mount the blades or plates on the bar 13. The blades are so positioned as to be swung around, as shown in Fig. 1 and by dotted lines in Fig. 6, with their chamfered edges in contact with the perimeters of the wheels 10 11, in which positions they will remove earth and foreign substances from the face of the wheel that otherwise might accumulate thereon and interfere with the proper advancement of the machine across the field. A retractile coil-spring 105 is connected at its outer end by a hook 106 to the outer end of the blade 103ª, and the inner end of said spring is connected to a pin 107, mounted in and projecting downwardly and rearwardly from the side bar 13. The spring is so arranged relative to the pin 104ª as that it will hold the blade 103ª in either of the positions shown by solid and dotted lines in Fig. 6, and the operation of the device is dependent upon the manual positioning thereof as desired, the spring serving only to hold the device as manually positioned. The blade 104 also is provided with a spring of identical construction with the one shown in Fig. 6.

I claim as my invention—

1. The combination of the supporting-wheels, the frame pivoted on the supporting-wheels, the tongue pivotally connected to the frame, the frame-oscillating mechanism connecting the tongue and frame, the independently-oscillating seedbox-carriers, the seedboxes on said carriers, the dropper-shafts, the dropper mechanism communicating with the boxes and actuated by said shafts, the check-yokes acting upon said shafts and the check-shaft connecting said check-yokes.

2. In a corn-planter, the combination of a seedbox-carrier mounted for oscillation, seedboxes mounted on said carrier, runners below said seedboxes and provided with standards communicating with the boxes, dropping mechanism in the runners, dropping mechanism in the seedboxes, a dropping-shaft acting upon the dropping mechanisms, means for actuating the dropping-shaft, and dragging-forks connected with the runners and trailing at the rear thereof to cover the furrow made by the runners.

3. In a corn-planter, the combination of a seedbox-carrier mounted for oscillation, seedboxes mounted on said carrier, runners below said seedboxes and provided with standards communicating with the boxes, dropping mechanism in the runners, dropping mechanism in the seedboxes and actuating mechanism whereby the dropping mechanisms are operated.

4. In a corn-planter, a pair of seedboxes mounted for oscillation, another pair of seedboxes mounted for oscillation in alinement therewith, dropping mechanism in the seedboxes, dropper-shafts operating said dropping mechanism, short shafts operated by the check-wire and operating the dropping-shafts and a check-shaft connecting the short shafts, which check-shaft comprises two alining members connected at their inner ends by a sleeve, the members having free longitudinal movement relative to each other and to the sleeve.

5. In a corn-planter, a supporting-frame, a seedbox-carrier mounted for oscillation on said frame, and a guard mounted on said frame and arranged for engagement with said carrier whereby the oscillation of the box-carrier is limited and determined.

6. In a corn-planter, a shaft 77, a ratchet-wheel on said shaft, a check-yoke mounted on said shaft loosely, a pawl on said check-yoke engaging said ratchet-wheel, the forward end of the check-yoke being bifurcated to receive the check-wire, and a roller 88 on the rear end of said yoke to hold the check-wire in sliding engagement with the yoke.

7. In a corn-planter, the frame-bar 25, the plate 95 rigidly mounted on and at an oblique angle transversely of the frame-bar 25, the plate 96 hinged at one end to one end of the plate 95, the locking-hook 97 pivoted on the plate 95 and engaging over the plate 96, the releasing-cord attached to the hook 97 and arranged for manual operation to release said hook from the plate 96, the roller 99 pivoted on and upwardly extending from the end portion of the plate 96 opposite to the hinge thereof and the retaining grooved roller 100 pivoted on the plate 96 in opposition to the roller 99.

8. In a corn-planter, a frame, a scraper pivoted near its center on said frame, a retractile coil-spring fixed at one end to the frame adjacent to the inner end of the scraper and fixed at the other end to the outer end portion of the scraper, the points of attachment of the spring being arranged relative to the pivot of the scraper so that the retractile force of said spring will retain the scraper in an operative or inoperative position in which said scraper is manually placed.

RICHARD V. BARRY.

Witnesses:
E. G. GRAHAM,
F. W. NEAL.